May 22, 1934. J. F. MUSTEE Re. 19,173

HOT WATER HEATER

Original Filed March 28, 1932 3 Sheets-Sheet 1

Inventor

By Joseph F. Mustee
Hull Brock & West
Attorney

May 22, 1934. J. F. MUSTEE Re. 19,173

HOT WATER HEATER

Original Filed March 28, 1932 3 Sheets-Sheet 2

Inventor

By Joseph F. Mustee
Hull Brock & West
Attorney

May 22, 1934. J. F. MUSTEE Re. 19,173

HOT WATER HEATER

Original Filed March 28, 1932 3 Sheets-Sheet 3

Inventor

Joseph F. Mustee

Every Hull Brock & West

Attorney

Reissued May 22, 1934

Re. 19,173

UNITED STATES PATENT OFFICE 19,173

HOT WATER HEATER

Joseph F. Mustee, University Heights, Ohio

Original No. 1,906,868, dated May 2, 1933, Serial No. 601,569, March 28, 1932. Application for reissue July 4, 1933, Serial No. 679,005

20 Claims. (Cl. 236—21)

This invention relates to a hot water heater and more particularly to a gas supply and system of ignition and control means therefor.

An object of the invention is to provide such a heater in which the supply of gas to the main burner is cut off when the water reaches a predetermined temperature and wherein the gas supply to both the main burner and the pilot light is cut off in case the pilot light is extinguished. A further object is to provide a peculiarly simple and effective system for accomplishing the foregoing results. A further object is to provide a novel and superior means for controlling the valves. A still further object is to provide means which may be manually operated to open the valve controlling the gas supply to the pilot burner and which when once actuated will hold such valve in open position until the pilot burner thermostat has been heated sufficiently to hold such valve open and will then return to normal inoperative position.

Figure 1:
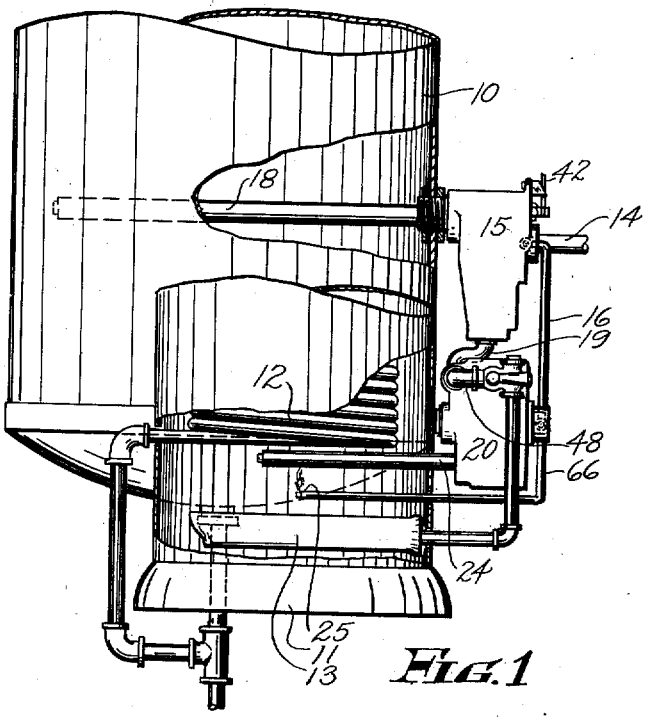
Figure 3:
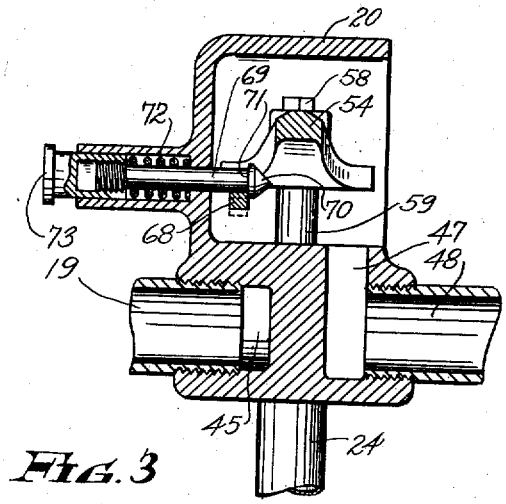
Figure 2:
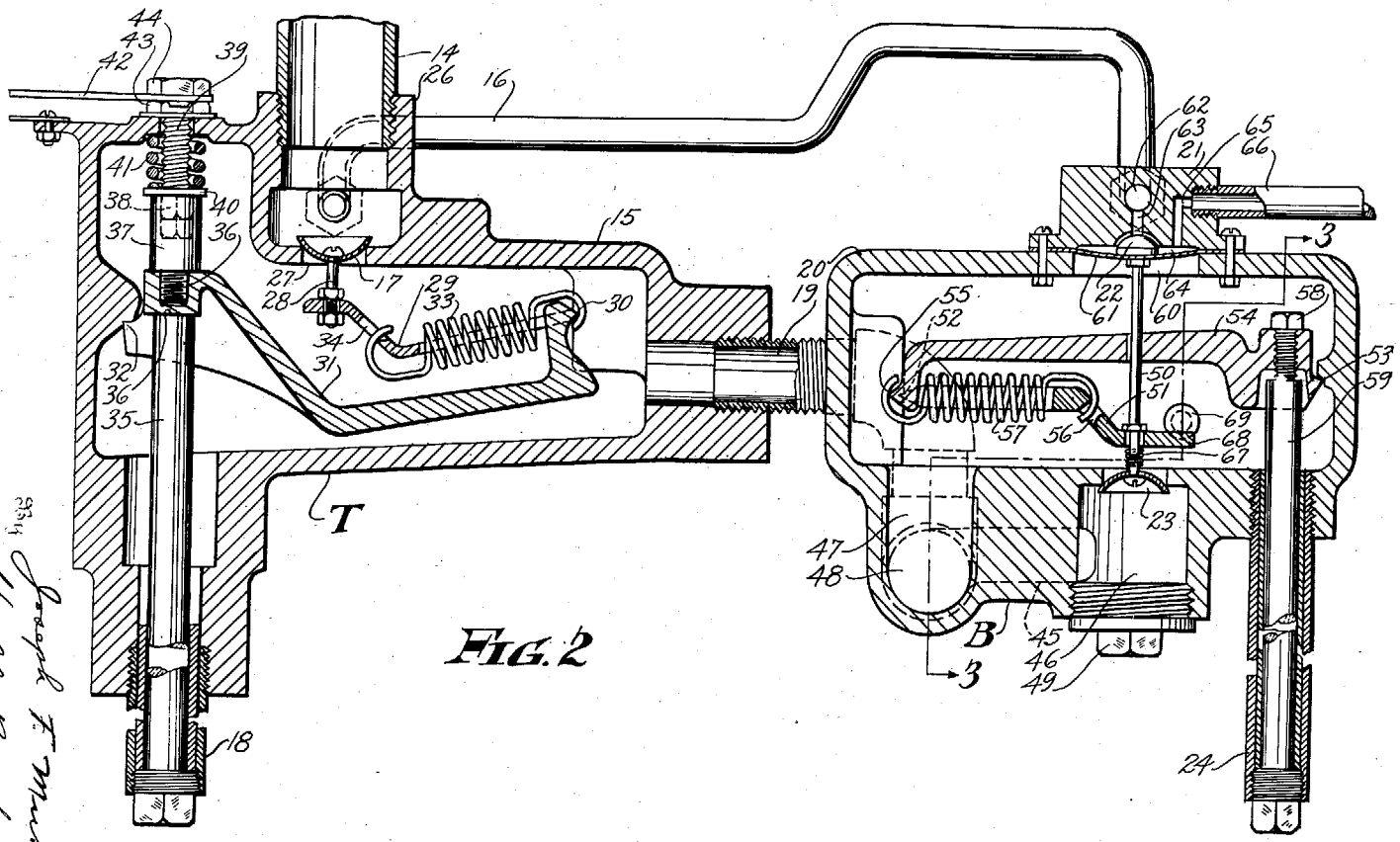
Figure 4:
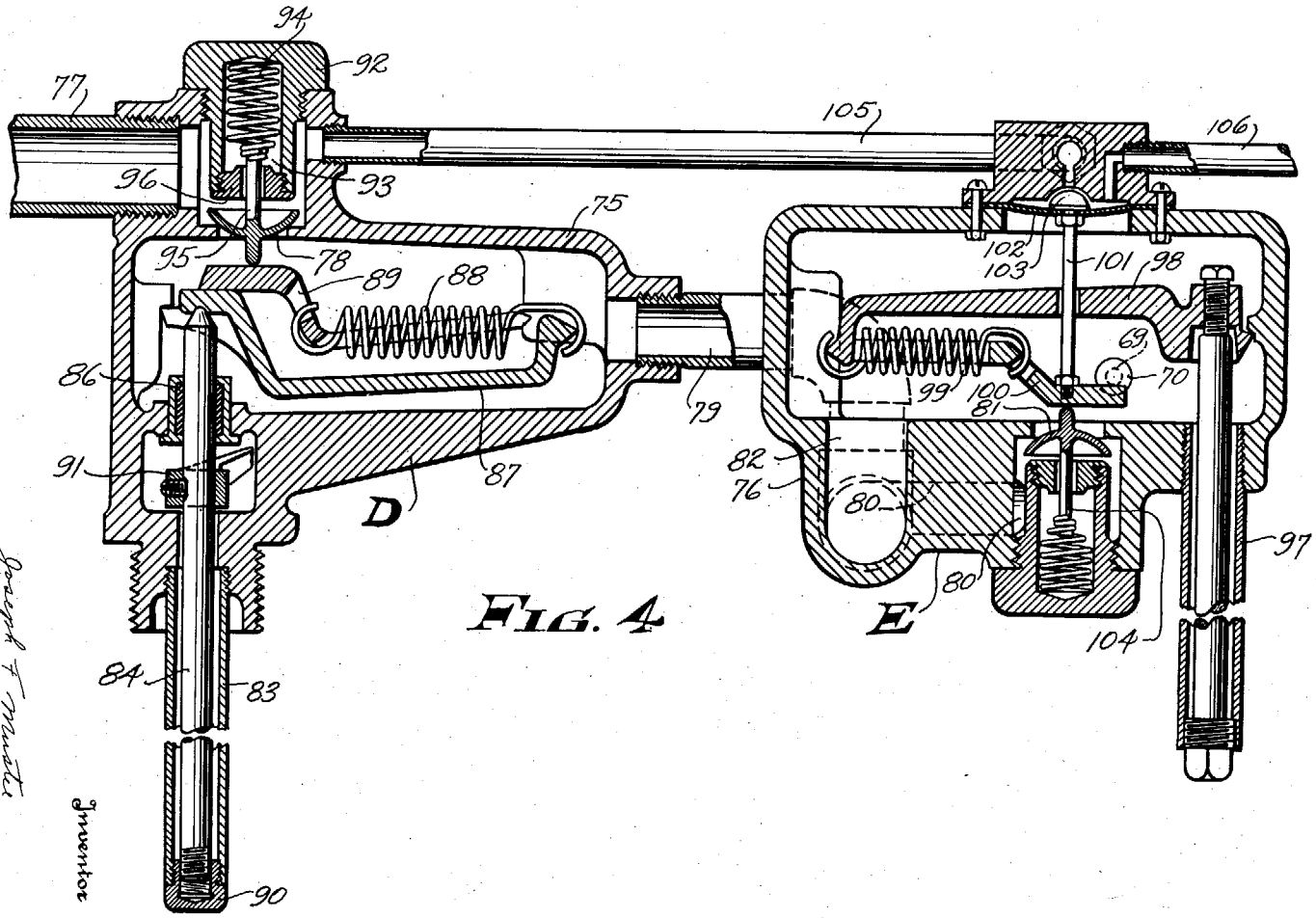

Other and more limited objects will be apparent from the following description when taken in connection with the accompanying drawings in which Fig. 1 is a fragmentary schematic elevation with parts broken away; Fig. 2 is a diagrammatic sectional view showing the details of construction of the valves, thermostats, valve operating means and passages; Fig. 3 is a sectional view taken substantially on the line 3—3 of Fig. 2; and Fig. 4 is a view similar to Fig. 2, showing a modified form.

Referring now to the drawings, the numeral 10 indicates a storage tank of a hot water heater and 11 indicates a covering for the burner and heating coils. Within the cover 11 is a heating coil 12 which is supplied with water in any suitable manner from the city or other water supply and which delivers heated water into the storage tank 10. Beneath the coil 12 is the main burner 13 which serves to heat water as its passes through such coil. Gaseous fuel is supplied through pipe 14 and delivers to the interior of a housing 15 and to a pilot burner supply line 16. The housing 15 contains a valve 17 actuated in a manner hereinafter described by a tank thermostat 18. Fuel passes from the housing 15 through a suitable connection 19 to a housing 20 and independently through the pipe 16 to the pilot burner valve assembly 21. Interconnected valves 22 and 23 controlled by a pilot burner thermostat 24 control both the pilot burner supply and the main burner supply. The pilot burner thermostat 24 is placed above the pilot burner 25 whereby to be heated thereby. From the foregoing it will be obvious that so long as the pilot burner remains ignited, both the pilot burner supply valve 22 and the main burner valve 23 will remain open and the main burner will be turned on and off by the tank thermostat 18 in accordance with the requirements of the tank. Should the pilot burner become extinguished, the thermostat 24 will operate to close valves 22 and 23, thereby cutting off the supply to both the main burner and the pilot burner. The housing 15 and associated structures will be hereinafter termed the tank valve assembly and will be indicated generally by the reference character T, while the housing 20 and associated structures will be termed the burner valve assembly and indicated generally by the reference character B.

The housing 15 is provided with a boss 26 internally threaded to receive the pipe 14 and has an opening 27 providing a passage and a valve seat against which the valve 17 seats. The pipe 16 is threaded into the boss 26 above the valve 17 whereby to be supplied independently of such valve. Connected to the valve 17 as by a bolt 28 is a lever 29 pivoted on a knife edge in a notch 30 in the casing 15. A lever 31 is pivoted on a knife edge at 32 and is connected by means of a spring 33 to the lever 29 by a hook extending through an opening 34 therein. The point at which the lever 31 engages the spring 33 is so positioned that by a slight movement it may pass from one side to the other of the point 30 at which the lever 29 engages the housing 15. Obviously this gives an overcentering effect so that by a small movement of the lever 31 the valve 17 may be fully opened or fully closed by a snap action. An element 35 of the thermostat 18 bears against one side of the lever 31 at the point 36 adjacent the pivot point 32. It will be observed that the distance from the point 36 to the point 32 is small as compared to the distance from the point 36 to point 30. By this means a considerable multiplication of motion is secured. Threaded into the lever 31 is an extension 36 of an adjustment member 37. The member 37 is provided with a square socket in the upper end thereof into which is received loosely a square head 38 of a bolt 39. The bolt 39 is provided with a collar 40 between which and the casing 15 is a spring 41. A pointer 42 is clamped between nuts 43 and 44 and serves to rotate the bolt 39 for adjusting the tension on the lever 31. Fuel which has passed through the valve 17 flows through the pipe 19 and enters the housing 20 through a passage 45 and enters the space 46. From this space it may pass the valve 23 and enter the housing 20. From here it may flow through the passage 47 and into the pipe 48. The space 46 is covered by a plug 49 which gives access to the valve 23. The valve 23 is controlled by a rod 50 which is controlled by a lever 51. This lever is pivoted on a knife edge 52 against a portion of the housing 20. Pivoted on a knife edge at 53 is a lever 54 having a long arm terminating in a knife edge 55 between which and an opening 56 in the lever 51 a spring 57 is connected. The lever 54 is provided with an adjusting screw 58 against which bears an element 59 of the thermostat 24. The levers 51 and 54, with the spring 57, secure the multiplication of motion and the overcentering effect in the same manner as do the corresponding elements 29 and 31 in the valve assembly T.

Sealed over an opening 60 in the housing 20 between such housing and the member 21 is a flexible diaphragm 61 through which the rod 50 is connected to the valve element 22. Gas from the pipe 16 enters the member 21 and flows through passages 62 and 63 and into the space 64 when the valve 22 is open. From the space 64 gas flows through the passage 65 into the pilot burner supply pipe 66. It will be observed that the rod 50 is composed of two parts connected by the spring 67 whereby the valve 23 may close prior to the closing of the valve 22 when the rod 50 is moved upwardly as seen in Fig. 2. Likewise the valve 22 will be opened before the spring 67 takes up the slack and opens the valve 23. In this way it is possible, by exerting pressure on a projection 68 of the lever 51, to open the pilot burner valve 22 to allow for lighting of the pilot burner and heating up of the thermostat 24 prior to the ignition of the main burner.

The mechanism for manually opening the pilot burner valve 22 for lighting the pilot burner comprises a cam plunger 69 provided with a conical nose 70 and a square shoulder 71. The plunger 69 is normally urged to retracted position by the spring 72 and is manually urged into the position shown in Fig. 3 by pressing the button 73 to overcome the action of the spring 72. It is obvious that when the plunger 69 is pushed in, the cam surface 70 will urge the projection 68 to the position shown in dotted lines in Fig. 3 thereby opening the pilot valve. As soon as the plunger is pushed to the position shown in Fig. 3, the projection 68 drops in behind the shoulder 71 and prevents return of the plunger 69 to normal position. However, when the pilot light has burned for a sufficient length of time, the thermostat 24 will be actuated and the valve 23 will be opened, the valve 22 being further opened. This will result in moving the projection 68 out of the path of the shoulder 71 thereby allowing the plunger 69 to move to normal position where it will not in any way interfere with free action of the valves and their controlling means.

In Fig. 4 I have shown schematically an embodiment of my invention employing a different thermostatic control and adjustment for the tank controlled valve as well as removable valve units. In other respects the mechanism in this modification is quite similar to that of the embodiment of Figs. 1 to 3.

The tank thermostat and mechanism controlled by it and contained within the housing 75 is indicated generally by the reference character D while the burner controlled thermostat and mechanism controlled by it and contained within the housing 76 is indicated by the reference character E. Gaseous fuel is admitted through the intake pipe 77, passes the valve 78 to the interior of the housing 75, through the conduit 79 into the passage 80, past the valve 81 into the interior of the housing 76 and finally through the passage 82 to the burner through a conduit corresponding to that 48 seen in Fig. 3.

A thermostat composed of concentric members 83 and 84 having properly selected and different coefficients of expansion is connected with the housing 75 and the member 84 extends thereinto through a packing gland 86 which allows longitudinal and rotary motion while preventing the escape of gas. The member 84 bears against a lever 87 which, through a spring 88, controls a lever 89 and gives an overcentering, snap action for controlling the valve 78. The position of the member 84 may be adjusted by rotating the same, its screw threaded connection with the plug 90 causing longitudinal motion when it is rotated. The member 84 may be rotated by an adjusting lever 91 secured thereto by a set screw.

The valve 78 is a part of a valve unit comprising a sealing plug 92 provided with a central depression 93 containing a spring 94 to which is connected a stem 95 which carries the valve 78. The spring is held in place by a member 96 threaded into the depression 93 and having a central opening through which the stem 95 passes.

The assembly E comprises a thermostat 97 which controls a lever 98 and indirectly through a spring 99 the lever 100. The lever 100 carries a rod 101 which is sealed through a diaphragm 102 and carries a valve element 103. The lever 100 controls the valve 81 by reason of its engagement against the stem 104 thereof. When the valve 81 is fully closed, there will preferably be a slight clearance between it and the lever 100. The valve 81 is a part of a valve unit identical in construction with that of which the valve 78 is a part, already described.

An independent fuel supply for the pilot burner is supplied through a conduit 105 and is controlled by the valve element 103 in a manner exactly like the first embodiment described and is supplied to the pilot burner through a conduit 106. In this modification the parts have been so proportioned that when the plunger 69 is pushed in, the lever 101 will move both the valve elements 103 and 81, thereby supplying fuel both to the pilot burner and the main burner. Otherwise the operation is exactly the same as in the embodiment first described, and it is to be understood that in either embodiment it is optional whether both the pilot burner and the main burner shall be opened by the plunger 69 or only the pilot burner, as illustrated in Fig. 2.

While I have shown and described illustrative embodiments of my invention, I wish it understood that I am not limited to the details shown but that numerous changes may be made without departing from the spirit of my invention as defined in the appended claims.

Having thus described my invention, what I claim is:

1. In a device of the class described, a gas supply line, a main burner, a pilot burner, a pair of valves, each operative to close said supply line, thermostatic means for controlling one of said valves, an auxiliary supply line for supplying gas to said pilot burner, a pilot burner valve for controlling said auxiliary supply line and a second thermostatic means controlled by the pilot burner for operating the pilot burner valve and the other of said first mentioned valves.

2. In a control system for a hot water heater, a main gas supply line, a tank controlled valve assembly controlled passage of gas through said supply line and including a valve and a thermostatic means controlling the same, an auxiliary pilot burner supply line, and a second valve assembly controlling both said main gas supply line and said pilot burner supply line and including, separate passages for gas from said supply lines, valves controlling said passages and a second thermostatic means for operating both said last mentioned valves together.

3. A control for a hot water heater, a main gas supply line and an auxiliary gas supply line, a pair of valves each adapted when in closed position to interrupt flow of gas through said main supply line, an auxiliary valve adapted when closed to interrupt flow of gas through said auxiliary supply line, a thermostatic means for controlling said auxiliary valve and one of said first mentioned valves, and a second thermostatic means controlling the other of said first mentioned valves.

4. In a control system for a hot water heater, a main gas supply line, a tank controlled valve assembly controlling passage of gas through said supply line and including a valve and a thermostatic means controlling the same, an auxiliary pilot burner supply line, and a second valve assembly controlling both said main gas supply line and said pilot burner supply line and including: separate passages for gas from said supply lines, interconnected valves controlling said passages, and a second thermostatic means for controlling said interconnected valves.

5. In a control system for a hot water heater, a main gas supply line, a tank controlled valve assembly controlling passage of gas through said main supply line and including a valve and a thermostatic means controlling the same, an auxiliary pilot burner supply line, and a second valve assembly controlling both said main gas supply line and said pilot burner supply line and including separate passages for gas from said supply lines, interconnected valves for controlling said passages, a second thermostatic means for controlling said interconnected valves, and manual means for opening the valve in said auxiliary supply line.

6. In a control system for a hot water heater, a main gas supply line, a tank controlled valve assembly controlling passage of gas through said main supply line and including a valve and a thermostatic means controlling the same, an auxiliary pilot burner supply line, and a second valve assembly controlling both said main gas supply line and said pilot burner supply line and including separate passages for gas from said supply lines, interconnected valves for controlling said passages, a second thermostatic means for controlling said interconnected valves, and manual means for opening the valve in said auxiliary supply line, said manual means comprising a movable member actuable from outside said assembly, spring pressed to a normal inoperative position and provided with means for preventing its return to such normal position until the valve in said auxiliary supply line has been further opened.

7. A hot water heater including a main burner, a pilot burner, a tank, a thermostatic element responsive to the temperature within said tank, a thermostatic element controlled by said pilot burner, a gas supply line, a valve within said line, controlling the passage of gas therethrough, means operated by said first thermostatic element for closing said valve when liquid in said tank has reached a predetermined temperature, a second, normally open valve in said supply line, means controlled by said second mentioned thermostatic element for closing said second valve when said pilot light is extinguished, a pilot burner supply line, a pilot burner valve also controlled by said second mentioned thermostatic element, normally open but closed when said pilot light is extinguished.

8. In a device of the class described, a gas supply line, a main burner, a pilot burner, a pair of valves, each operative to close said supply line, thermostatic means for controlling one of said valves, an auxiliary supply line for supplying gas to said pilot burner, a pilot burner valve for controlling said auxiliary supply line and a second thermostatic means controlled by the pilot burner for operating the pilot burner valve and the other of said first mentioned valves, yieldable means connecting the valves controlled by said second thermostatic means whereby the pilot burner valve can be opened without opening the other, and manual means for opening said pilot burner valve.

9. In a control system for a hot water heater, a main gas supply line, a tank controlled valve assembly controlling passage of gas through said supply line and including a valve and a thermostatic means controlling the same, an auxiliary pilot burner supply line, and a second valve assembly controlling both said main gas supply line and said pilot burner supply line and including separate passages for gas from said supply lines, interconnected valves for controlling said passages, a second thermostatic means for controlling said valves, said thermostatic means including a temperature responsive system and an overcentering, compound lever system operated by said temperature responsive system.

10. In a device of the class described, a gas supply line, a main burner, a pilot burner, a pair of valves, each operative to close said supply line, thermostatic means for controlling one of said valves, an auxiliary supply line for supplying gas to said pilot burner, a pilot burner valve for controlling said auxiliary supply line and a second thermostatic means controlled by the pilot burner for operating simultaneously the pilot burner valve and the other of said first mentioned valves.

11. In a device of the class described, a gas supply line, a main burner, a pilot burner, a pair of valves, each operative to close said supply line, thermostatic means for controlling one of said valves, an auxiliary supply line for supplying gas to said pilot burner, a pilot burner valve for controlling said auxiliary supply line and a second thermostatic means controlled by the pilot burner for operating the pilot burner valve and the other of said first mentioned valves, the valves controlled by said second thermostatic means being interconnected.

12. In a device of the class described, as a sub-combination, a valve assembly, separate passages formed therein, interconnected valves controlling said passages, an overcentering lever controlling said valves, a second lever controlling said overcentering lever, and a thermostatic element controlling said second lever.

13. In a device of the character described, as a sub-combination, a valve assembly including independent passages, a valve controlling each of said passages, means including a resilient portion connecting said valves for operation together, thermostatic means controlling both said valves and manual means adapted to open one of said valves without opening the other.

14. In a device of the character described, as a sub-combination, a valve assembly, independent passages therethrough, a valve controlling each of said passages, a connector extending between the movable elements of said valves, including a resilient section and being of such length that when both said valves are closed said resilient section is stretched, and manual means for moving said connecting means a distance sufficient to open one of said valves but insufficient to open the other.

15. In a device of the character described, as a sub-combination, a valve assembly, independent passages therethrough, a valve controlling each of said passages, a connector extending between the movable elements of said valves, including a resilient section and being of such length that when both said valves are closed said resilient section is stretched, manual means for moving said connecting means a distance sufficient to open one of said valves but insufficient to open the other, said manual means being spring pressed to a normal inoperative position and including means adapted to prevent its return to such normal position, after it has been actuated to open one of said valves, prior to the opening of the other of said valves.

16. In a device of the character described, as a sub-combination, a valve assembly including independent passages, valves controlling said passages, a connector extending between the movable elements of said valves, a pivoted lever adapted to control said connector, a second pivoted lever extending in the same general direction as said first pivoted lever and having a portion adapted to pass by a small motion from one side to the other of the pivot of said first lever and a spring connecting said point with a point on said first lever on the opposite side of its pivot point whereby to secure an overcentering effect, and a thermostatic element controlling said second mentioned lever.

17. In a device of the character described, as a sub-combination, a valve assembly including independent passages, valves controlling said passages, a connector extending between the movable elements of said valves, a pivoted lever adapted to control said connector, a second pivoted lever extending in the same general direction as said first pivoted lever and having a portion adapted to pass by a small motion from one side to the other of the pivot of said first lever and a spring connecting said point with a point on said first lever on the opposite side of its pivot point whereby to secure an overcentering effect, a thermostatic element controlling said second mentioned lever, and a manual means for moving said first lever a short distance, holding it at that point until it shall have been moved further by said thermostatic element and then returning to normal inoperative position.

18. In a device of the character described, a valve assembly including a casing having a passage, a valve controlling said passage, a thermostatic element, a lever pivoted at one end on said casing, the opposite end of said lever being adapted to control said valve, a second lever pivoted at one end on said casing substantially opposite said first lever and extending in the same general direction as said first pivoted lever and having a portion adapted to pass by a small motion from one side to the other of the pivot of said first lever and a spring connecting said portion with the first lever at a point on the latter intermediate its ends, and tending to swing such lever to one side of its pivot point whereby to secure an overcentering effect, said thermostatic element being arranged to engage said second lever and operable to swing said portion thereof relative to said first lever to shift the overcentering effect of said spring to the other side of the pivot for said first lever.

19. In a device of the character described, a valve assembly including a casing having a passage, a valve controlling said passage, a thermostatic element, a lever pivoted at one end on said casing, the opposite end of said lever being adapted to control said valve, a second lever pivoted at one end on said casing substantially opposite said first lever and extending in the same general direction as said first pivoted lever and having a portion adapted to pass by a small motion from one side to the other of the pivot of said first lever and a spring connecting said portion with an intermediate point on said first lever and tending to swing the latter lever to one side of its pivot point whereby to secure an overcentering effect, said thermostatic element being arranged to engage said second lever and operable to swing said portion thereof relative to said first lever to shift the overcentering effect of said spring to the other side of the pivot for said first lever.

20. In a device of the class described, a valve assembly including a casing having a passage, a valve controlling said passage, a thermostatic element, a lever having pivotal engagement at one end with one wall of said casing, the opposite end of said lever being adapted to control said valve, a second lever engaging said thermostatic element and arranged to be operated thereby and disposed in side by side relation to said first lever and having pivotal engagement with the opposite wall of said casing at that end remote from the end of said first lever that engages said casing, the outer end of said second lever being movable relative to the pivot for said first lever, a spring connecting an intermediate end of said second lever with the outer portion of said first lever and normally tending to swing said first lever about its pivot upon movement of the said second lever to either side thereof, said spring being arranged to maintain said levers in pivotal engagement with said casing walls and said second lever being offset intermediate its pivot and outer end and said first lever and spring being positioned within said off-set, whereby said spring tends to swing said second lever toward said thermostatic element.

JOSEPH F. MUSTEE.